(12) United States Patent
James

(10) Patent No.: US 11,653,789 B2
(45) Date of Patent: May 23, 2023

(54) CONVERTIBLE SHELF FOR A COOKING APPLIANCE

(71) Applicant: Dansons US, LLC, Phoenix, AZ (US)

(72) Inventor: Chris James, Phoenix, AZ (US)

(73) Assignee: Dansons US, LLC, Scottsdale, AZ (US)

(*) Notice: Subject to any disclaimer, the term of this patent is extended or adjusted under 35 U.S.C. 154(b) by 764 days.

(21) Appl. No.: 16/710,477

(22) Filed: Dec. 11, 2019

(65) Prior Publication Data
US 2021/0177205 A1  Jun. 17, 2021

(51) Int. Cl.
| | | |
|---|---|---|
| *A47J 37/07* | (2006.01) | |
| *A23B 4/044* | (2006.01) | |
| *A47J 45/00* | (2006.01) | |
| *B67B 7/16* | (2006.01) | |
| *A47B 96/02* | (2006.01) | |

(52) U.S. Cl.
CPC .......... *A47J 37/0786* (2013.01); *A23B 4/044* (2013.01); *A47J 45/00* (2013.01); *B67B 7/16* (2013.01); *A47B 96/028* (2013.01)

(58) Field of Classification Search
CPC ............ A47J 2037/0777; A47J 37/0713; A47J 45/00; A47J 37/0786; B67B 7/16; A47B 96/028; A23B 4/044
USPC .......................................... 126/25 R; 99/422
See application file for complete search history.

(56) References Cited

U.S. PATENT DOCUMENTS

| | | | |
|---|---|---|---|
| 4,955,358 A * | 9/1990 | Harris ................. | A47J 37/0786 126/41 R |
| 5,076,256 A | 12/1991 | Raymer et al. | |
| 5,323,758 A * | 6/1994 | Minshall ............. | A47J 37/0786 126/41 R |
| 5,941,229 A | 8/1999 | Schlosser et al. | |
| 6,474,327 B1 | 11/2002 | Bossier | |
| 9,004,427 B2 | 4/2015 | Irudayaraj et al. | |
| 2018/0153344 A1 | 6/2018 | Scott et al. | |

FOREIGN PATENT DOCUMENTS

WO  2016153547  9/2016

OTHER PUBLICATIONS

Australian Examination Report No. 1 for Application No. 2020273379 dated Jul. 28, 2021, 6 pages.
European Search Report for Application No. 20209905.7 dated Mar. 24, 2021, 8 pages.
Canadian Office Action for Application No. 3,101,897, dated May 16, 2022, 3 pages.

* cited by examiner

*Primary Examiner* — Katina N. Henson
(74) *Attorney, Agent, or Firm* — Seyfarth Shaw LLP

(57) ABSTRACT

A shelving system for a cooking appliance, such as a smoker or grill is disclosed. A convertible and removable shelf may be coupled to a frame in a variety of positions and orientations. The convertible shelf may be extended and locked into a first position at a first location or pivotally lowered to a second position without removing the shelf. Additionally, the shelf may be removed from the first location and secured to a second location providing a storage surface. The flexible location and orientation of the convertible shelf provides for more efficient and economical storage and portability of the appliance.

20 Claims, 5 Drawing Sheets

CONVERTIBLE SHELF FOR A COOKING APPLIANCE

TECHNICAL FIELD OF INVENTION

The presently disclosed embodiments relate generally to grills and smokers. More particularly, the presently disclosed embodiments relate to a removable and convertible shelf for a grill or smoker frame.

BACKGROUND OF THE INVENTION

Smokers are a common outdoor cooking appliance that burn fuel at a low temperature to cause smoke to flow into a cook chamber. The smoke not only cooks the meat within the cook chamber but also provides flavor during the cooking process. Similarly, grills can use a similar process to burn fuel, typically at higher temperatures, to provide a flavor to the food that is difficult to obtain using a conventional indoor cooking appliance.

Grills and smokers are common types of appliances used for cooking meat or other food. These appliances typically consist of a cooking chamber where food is placed and heat and or smoke are introduced to the cooking chamber by a number of mechanisms, including charcoal, gas, wood pellets or electric heating elements. The cooking chambers, in the case of outdoor grills and smokers, are supported by a frame that raises the cooking chamber off the ground and to a user-friendly height. The frame may include wheels for portability and cabinets for storage of cooking utensils and other supplies. Certain frames may include one or more fixed shelves providing a surface on which the user may place items needed during a cooking operation. These fixed shelves increase the size and weight of the frame making storage and portability of the appliance cumbersome and difficult.

SUMMARY OF THE INVENTION

The present disclosure provides a shelving system for a cooking appliance, such as a smoker or grill. According the presently disclosed embodiments, a convertible and removable shelf may be coupled to a frame in a variety of positions and orientations. The convertible shelf may be extended and locked into a first position at a first location or pivotally lowered to a second position without removing the shelf. Additionally, the shelf may be removed from the first location and secured to a second location providing a storage surface. The flexible location and orientation of the convertible shelf provides for more efficient and economical storage and portability of the appliance.

According to at least some of the disclosed embodiments, a cooking appliance support may include a frame having a first side and a second side and a first span and a second span. The first span and second span may couple the first side and the second side of the frame. The first span and the second span each may define at least one groove. A first bracket and a second bracket may be coupled to the first side of the frame. The first bracket and the second bracket each may define a channel, that further defines a first notch and a second notch. A shelf may include a plurality of pegs, and be removably coupled to the frame in one of a first location or a second location. The first location may include at least two pegs engaging the at least one groove of the first span and the second span. The second position may include at least two pegs engaging the channel of the first bracket and the second bracket.

According to another embodiment, a cooking appliance may include a cooking chamber and a frame coupled to the cooking chamber. The frame may have a first side and a second side and a first span and second span coupling the first side and the second side of the frame. The first span and the second span each may define at least one groove. A first bracket and a second bracket may be coupled to the first side of the frame. The first bracket and the second bracket each may define a channel further defining a first notch and a second notch. A shelf may include a plurality of pegs and be removably coupled to the frame in one of a first location or a second location. The first position may include at least two pegs engaging the channel of the first bracket and the second bracket. The second position may include at least two pegs engaging the at least one groove of the first support span and the second support span.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
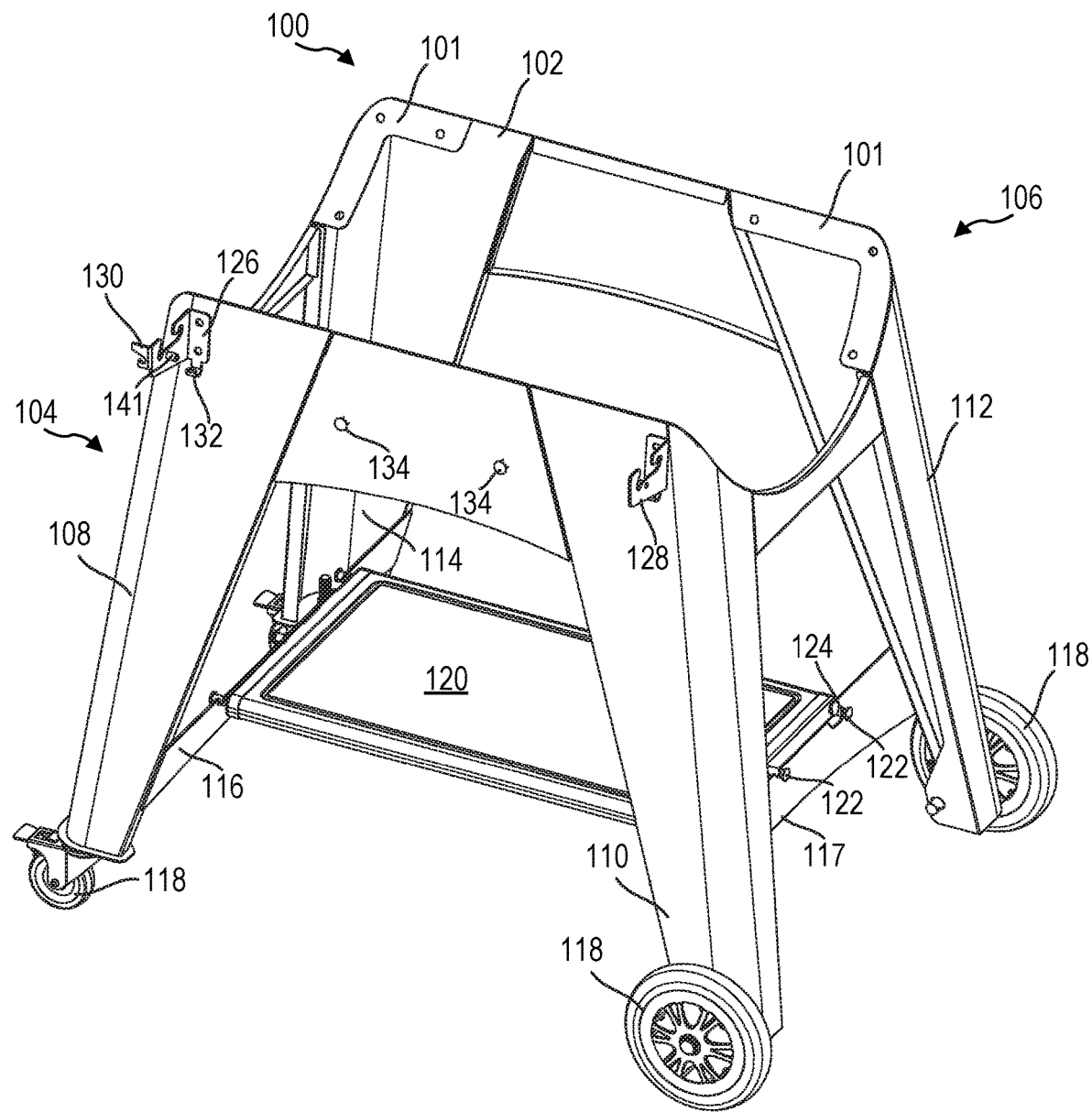
FIG. 1 is an isometric view of a cooking appliance support according to at least some of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments include a support for a cooking appliance, such as a smoker or grill, with a convertible and removable shelf. The shelf may be coupled to a frame in a variety of positions and orientations. The convertible shelf may be extended and locked into a first orientation at a first location or pivotally lowered to a second orientation without removing the shelf. Additionally, the shelf may be removed from the first location and secured to the frame in a second location providing a storage surface. The flexible location and orientation of the convertible shelf provides for more efficient and economical storage and portability of the appliance.

Figure 2:
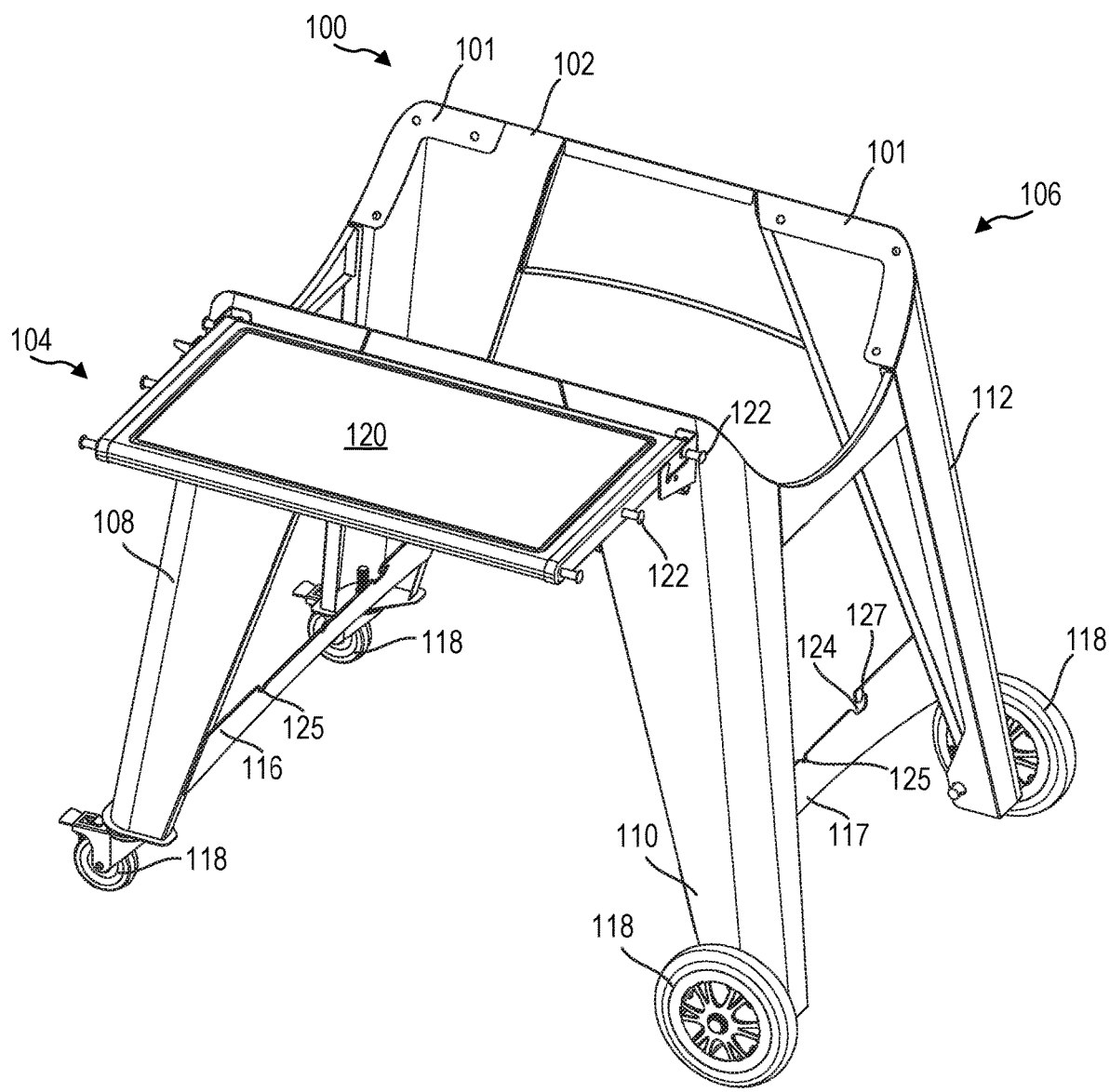
FIG. 2 is an isometric view of an alternative configuration of a cooking appliance support according to at least some of the presently disclosed embodiments.
Figure 3:
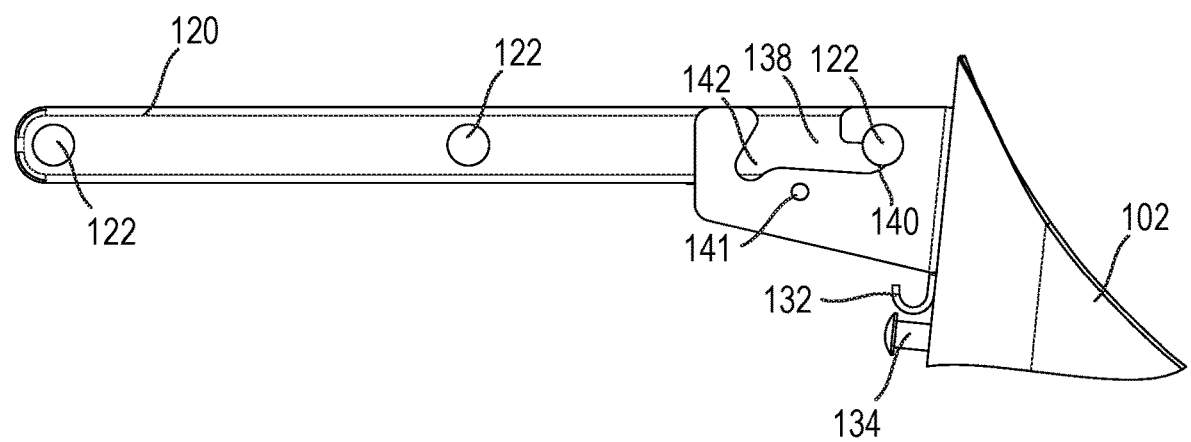
FIG. 3 is a side view of a bracket and shelf configuration according to at least some of the presently disclosed embodiments.

FIGS. 1-3 depicts a cooking appliance support 100 in varying configurations according to at least some of the presently disclosed embodiments. FIG. 1 depicts the cooking appliance support 100 with a shelf 120 in a first location. The cooking appliance support 100 may include a frame 102 for supporting a cooking chamber (not shown), such as a grill or smoker. The frame 102 may include one or more support surfaces 101 to which a cooking chamber may be coupled. The cooking chamber may be any one of several known cooking chamber types, including but not limited to a grill, smoker, or the like. The support surfaces 101 may for example, be substantially concave or be sized and shaped to receive a convex cooking chamber.

The frame 102 may include or define a first side 104 and a second side 106. For example, the frame 102 may include a first side 104 configured to be a front side of the cooking appliance support 100 while the second side 106 may be configured to be a back side. A first bracket 126 and a second bracket 128 may be coupled to the first side 104 of the frame 102. The first bracket 126 may include or define a bottle opener 130 and both the first bracket 126 and second bracket 128 may include or define a hook 132. The first side 104 may include or define one or more hangers 134 that, in conjunction with the hooks 132 may support or retain a cooking accessory. The frame 102 may include or define legs 108, 110, 112, 114, extending downward from the support surfaces 101. The first side 104 of the frame 106 may be coupled by a first span 116 between a first pair of legs 108, 114 and a second span 117 between a second pair of legs 110, 112. The frame 102 may be supported on each leg 108, 110, 112, 114 by wheels 118.

The shelf 120 may be configured to couple to the frame 102 in a first location, as depicted in FIG. 1. The shelf 120 may include or define a plurality of pegs 122 extending from the sides of the shelf 120. According to one aspect, the plurality of pegs 122 may include three pairs of planar pegs 122 extending from opposing sides of the shelf 120. In the first location, the shelf 120 may be coupled to the first span 116 and the second span 117. Each of the first span 116 and the second span 117 may define one or more grooves 124, 125 (FIG. 2) configured to support and/or retain the pegs 122 of the shelf 120. According to one embodiment a first groove 124 may further include or define a span notch 127 (FIG. 2) for retaining a first pair of planar pegs 122. The first groove 124 and span notch 127 may be sized and shaped such that the pegs 122 may be inserted into the first groove 124 with the shelf 120 tilted at an upward angle until the pegs 122 engage the span notch 127. The shelf 120 may then be lowered to a substantially flat orientation whereby the second and third pairs of pegs 122 engage the corresponding grooves 125 in the first span 116 and the second span 117. The first location of the shelf 120 may provide a convenient storage location partially protected from above by the cooking chamber, when installed. When the coking appliance is stored or not in use, locating the shelf 120 in the first location may minimize the footprint and spatial area required for storage of the cooking appliance, while providing additional protected storage.

FIG. 2 depicts the cooking appliance support 100 in an alternative configuration including the shelf 120 at a second location coupled to the first side 104 of the 102. In the second location, the shelf 120 may be coupled to the frame 102 by the first bracket 126 and the second bracket 128. The shelf 120, as shown in FIG. 2, may be coupled to the frame 102 at a first orientation extending from the frame 102 in a substantially perpendicular direction. According to the first orientation, the pegs 122 of the shelf 120 may be coupled to a channel 138 defined by the first bracket 126 and the second bracket 128, as shown in FIG. 3.

FIG. 3 depicts a side view of the second bracket 128 and the shelf 120 in the second location and at the first orientation. The second bracket 128 (and the first bracket 126) may define a channel 138 into which the pegs 122 of the shelf 120 may be inserted. The channel 138 may include or define a first notch 140 and a second notch 142. The shelf 120 may be coupled to the first bracket 126 and the second bracket 128 by inserting the pegs 122 into the channel 138 while the shelfs is tilted upward. When the pegs 122 engage the first notch 140, the shelf 120 may be lowered to an orientation substantially perpendicular to the frame 102. A pin 141 may be included or formed in the first bracket 126 and the second bracket 128 such that the shelf 120 is further supported by the pin 141 in addition to cantilevered force of the peg 122 on the first notch 140. The first orientation at the first location provides a shelf 120 that is usable to hold items and materials needed or desired during preparation or cooking. When the shelf 120 is not needed or desired, the shelf 120 may be removed to the first location described herein, or may be pivoted to a second orientation.

Figure 4:
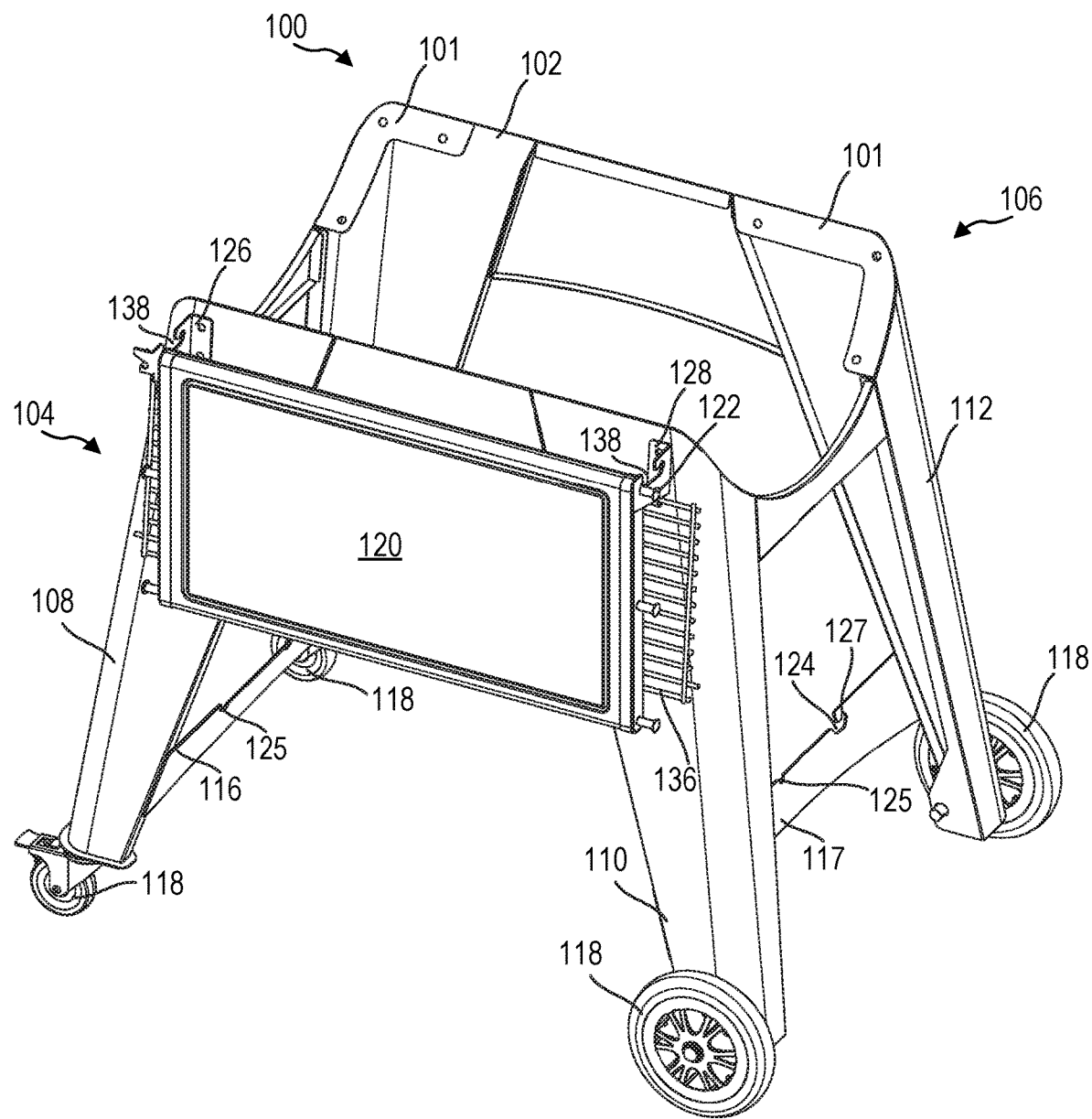
FIG. 4 is an isometric view of an alternative configuration of a cooking appliance support according to at least some of the presently disclosed embodiments.

FIG. 4 depicts a cooking appliance support 100 according to another configuration in which the shelf 120 is coupled to the frame 102 at the first position in a second orientation, for example substantially parallel to the first side 104 of the frame 102. In such an orientation, the shelf 120 may be coupled to the frame 102 by the channel 138 of the first bracket 126 and the second bracket 128, however the pegs 122 may engage with the second notch 142. The second notch 142 is disposed in front of the pin 141 therefore there is no cantilevered force upon the shelf 120 and, as such, the shelf 120 may hang downward from the first bracket 126 and the second bracket 128.

To reconfigure the shelf 120 from the first orientation (substantially perpendicular to the frame 102) to the second orientation (substantially parallel to the frame 102), the shelf 120 may be tilted upwards such that the pegs 122 may disengage from the first notch 140. The shelf 120 may be slid away from the frame 102 while maintaining the pegs 122 in the channel 138 until the pegs 122 engage the second notch 142. The shelf 120 may then be lowered downward in a hanging position substantially parallel to the first side 104 of the frame 102. As shown in FIG. 4, a grill rack 136 may be coupled to the hooks 132 of the first bracket 126 and the second bracket 128 as well as the hangars 134 (FIG. 1).

Figure 5:
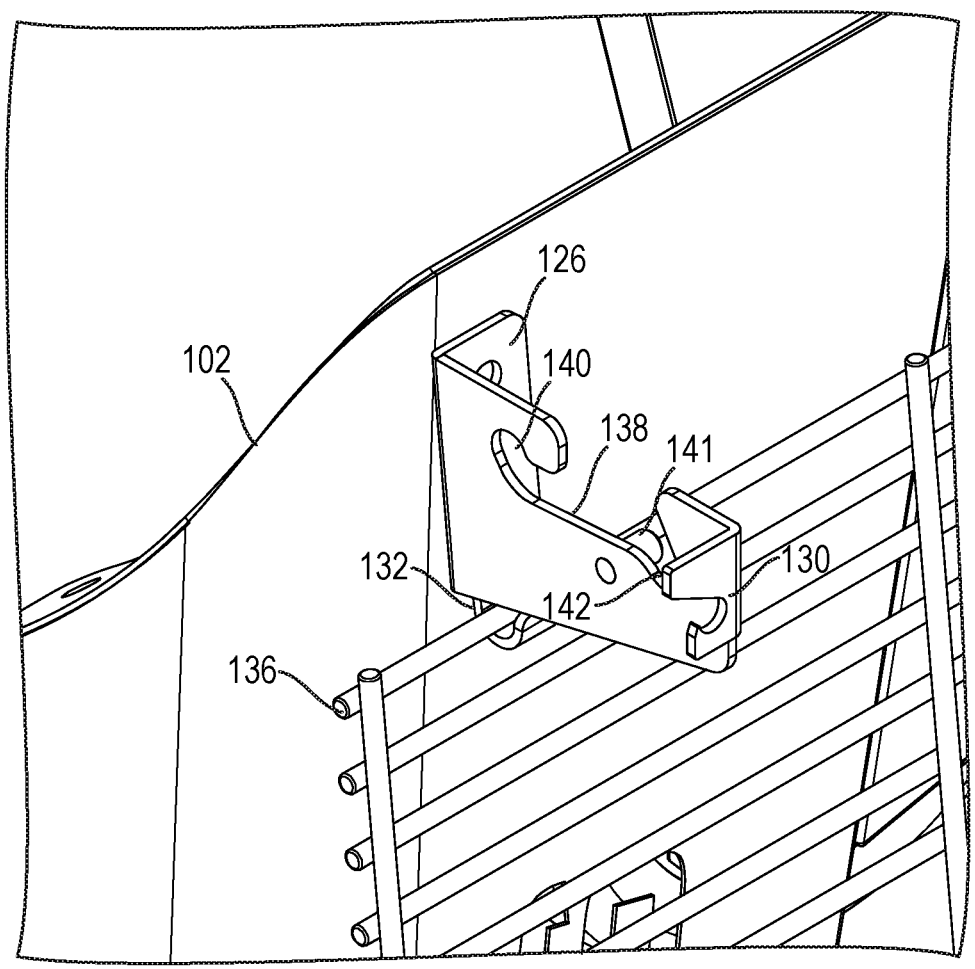
FIG. 5 is an expanded view of a bracket according to at least some of the presently disclosed embodiments.

FIG. 5 depicts an expanded view of the first bracket 126 coupled to the first side 104 of the frame 102. The First bracket 126 may include or define a bottle opener 130 and a hook 132. The hook 132 may be configured to hold or retain a cooking accessory such as a grill rack 136, a cooking utensil, a cloth, a thermometer or the like. As shown in FIG. 5, the hook 132 may support a grill rack 136 that is similarly supported by a hook 132 included or defined by the second bracket 128 and the hangers 134 (FIG. 1)

As used herein, the terms "grill" or "smoker" are intended to be construed broadly as including any outdoor cooking appliance that uses heat. For example, a "grill" or "smoker" according to the present invention can include a grill, smoker, griddle, burner, wood stove, outdoor heater, or any other outdoor cooking appliance that uses heat.

Although embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims. The detailed description and drawings are merely illustrative of the present disclosure rather than limiting, the scope of the present disclosure being defined by the appended claims and equivalents thereof.

Benefits, other advantages, and solutions to problems have been described herein with regard to specific embodiments. However, the benefits, advantages, solutions to problems, and elements that may cause any benefit, advantage, or solution to occur or become more pronounced are not to be construed as critical, required, or essential features or elements of the disclosure.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

Further, it should be appreciated that in the appended claims, reference to an element in the singular is not intended to mean "one and only one" unless explicitly so stated, but rather "one or more."

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The words "illustrative" or "exemplary" are used herein to mean "serving as an example, instance, or illustration." Any aspect described herein as "illustrative" or "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A cooking appliance support comprising:
    a frame having a first side and a second side;
    a first span and a second span, the first span and second span coupling the first side and the second side of the frame, the first span and the second span each defining at least one groove;
    a first bracket and a second bracket coupled to the first side of the frame, the first bracket and the second bracket each defining a channel, the channel defining a first notch and a second notch; and
    a shelf including a plurality of pegs, the shelf removably coupled to the frame in one of a first location or a second location, the first location including at least two pegs engaging the at least one groove of the first span and the second span, the second location including the at least two pegs engaging the channels of the first bracket and the second bracket.

2. The cooking appliance support of claim 1 wherein the second location comprises the shelf pivotally coupled to the first bracket and the second bracket in one of a first orientation or a second orientation, the first orientation including the at least two pegs engaging the first notches of the first bracket and the second bracket, the second orientation including the at least two pegs engaging the second notches of the first bracket and the second bracket.

3. The cooking appliance support of claim 2 wherein the first orientation is substantially perpendicular to the first side of the frame.

4. The cooking appliance support of claim 2 wherein the second orientation is substantially parallel to the first side of the frame.

5. The cooking appliance support of claim 1 wherein the first side of the frame includes a first pair of legs and the second side of the frame includes a second pair of legs, the first span and the second span each coupling the first pair of legs to the second pair of legs.

6. The cooking appliance support of claim 5 wherein the first span and the second span are coupled to a lower portion of the first pair of legs and the second pair of legs.

7. The cooking appliance support of claim 1 wherein the frame defines a support surface for a cooking chamber.

8. The cooking appliance support of claim 1 wherein the support surface is substantially concave.

9. The cooking appliance support of claim 1 wherein the second location is substantially beneath the support surface.

10. The cooking appliance support of claim 1 further comprising a plurality of wheels coupled to the frame.

11. The cooking appliance support of claim 1 wherein the plurality of pegs include three pairs of planar pegs.

12. The cooking appliance support of claim 11 wherein each of the three pairs of planar pegs extend from opposite sides of the shelf.

13. The cooking appliance support of claim 12 wherein the at least one groove of the first span and the second span comprise a first groove, a second groove and a third groove, the first groove defining a span notch, wherein in the second location, the span notch receives a first pair of the three pairs of planar pegs, the second groove and the third groove receiving the second pair and third pair of planar pegs, respectively.

14. The cooking appliance support of claim 1 wherein the first bracket includes a bottle opener.

15. The cooking appliance support of claim 1 wherein the first bracket and the second bracket include a hook configured to receive a cooking accessory.

16. The cooking appliance support of claim 15 wherein the cooking accessory is one of a grill rack, a cooking utensil, a cloth, or a thermometer.

17. A cooking appliance comprising:
    a cooking chamber;
    a frame coupled to the cooking chamber, the frame having a first side and a second side;
    a first span and a second span; the first span and second span coupling the first side and the second side of the frame; the first span and the second span each defining at least one groove;
    a first bracket and a second bracket coupled to the first side of the frame, the first bracket and the second bracket each defining a channel, the channel defining a first notch and a second notch; and
    a shelf including a plurality of pegs, the shelf removably coupled to the frame in one of a first location or a second location, the first position including at least two pegs engaging the channel of the first bracket and the second bracket, the second location including at least two pegs engaging the at least one groove of the first support span and the second support span.

18. The cooking appliance of claim 17 wherein the shelf is pivotally coupled to the first bracket and the second bracket in one of a first orientation or a second orientation, the first orientation including the at least two pegs engaging the first notches of the first bracket and the second bracket, the second orientation including the at least two pegs engaging the second notches of the first and second bracket.

19. The cooking appliance of claim 18 wherein the first orientation is substantially perpendicular to the first side of the frame.

20. The cooking appliance of claim 18 wherein the second orientation is substantially parallel to the first side of the frame.

* * * * *